United States Patent
Won et al.

(10) Patent No.: US 6,831,439 B2
(45) Date of Patent: Dec. 14, 2004

(54) APPARATUS FOR MEASURING MAGNETIC FLUX OF SYNCHRONOUS RELUCTANCE MOTOR AND SENSORLESS CONTROL SYSTEM FOR THE SAME MOTOR

(75) Inventors: June Hee Won, Seoul (KR); Jae Yoon Oh, Kyungki-do (KR); Kyung Hoon Lee, Seoul (KR); Dal Ho Cheong, Seoul (KR)

(73) Assignee: Electronics, Inc., Seoul (KR)

( * ) Notice: Subject to any disclaimer, the term of this patent is extended or adjusted under 35 U.S.C. 154(b) by 0 days.

(21) Appl. No.: 10/614,813

(22) Filed: Jul. 9, 2003

(65) Prior Publication Data
US 2004/0061472 A1 Apr. 1, 2004

(30) Foreign Application Priority Data
Sep. 26, 2002 (KR) .................................. 10-2002-0058453
Oct. 10, 2002 (KR) .................................. 10-2002-0061856

(51) Int. Cl.[7] ............................... H02P 1/46; H02P 7/36
(52) U.S. Cl. ...................... 318/701; 318/700; 318/727; 318/800; 318/802; 322/20; 322/28
(58) Field of Search ................................ 318/138, 139, 318/245, 254, 439, 700–730, 800–815; 322/28, 52, 59, 20, 89

(56) References Cited

U.S. PATENT DOCUMENTS

| | | | | |
|---|---|---|---|---|
| 6,137,258 A | * | 10/2000 | Jansen | 318/802 |
| 6,586,914 B2 | * | 7/2003 | Garrigan et al. | 322/28 |
| 6,724,168 B2 | * | 4/2004 | Cheong et al. | 318/701 |
| 2003/0015987 A1 | * | 1/2003 | Cheong et al. | 318/701 |
| 2003/0094917 A1 | * | 5/2003 | Garrigan et al. | 318/700 |
| 2003/0197490 A1 | * | 10/2003 | Garrigan et al. | 322/20 |
| 2003/0205989 A1 | * | 11/2003 | Garrigan et al. | 322/28 |

* cited by examiner

Primary Examiner—Paul Ip
(74) Attorney, Agent, or Firm—Greenblum & Bernstein, P.L.C.

(57) ABSTRACT

Disclosed are a flux observer and a sensorless control system of a synchronous reluctance motor. The flux observer includes an estimated flux output unit, a measured flux output unit, and a fixed/rotational coordinate converter. The flux observer estimates a flux of a synchronous reluctance motor by removing higher harmonic components of a current in a rotational coordinate system which flows into the motor. The measured flux output unit measures a flux in a fixed coordinate system by combining a voltage in the fixed coordinate system, which is applied to the motor, and a current in the fixed coordinate system, from which higher harmonic components are removed, with the estimated flux outputted from the estimated flux output unit. The fixed/rotational coordinate converter converts the measured flux outputted from the measured flux output unit to a measured flux in the rotational coordinate system.

15 Claims, 6 Drawing Sheets under the sensorless control. Specifically, the sensorless control system reduces errors in estimating the speed and rotation angle of the rotor when the motor starts or operates at a low speed, thereby improving system stability.

APPARATUS FOR MEASURING MAGNETIC FLUX OF SYNCHRONOUS RELUCTANCE MOTOR AND SENSORLESS CONTROL SYSTEM FOR THE SAME MOTOR

CROSS-REFERENCE TO RELATED APPLICATION

The present application claims priority under 35 U.S.C. § 119 of Korean Application No. 2002-58453, which was filed on Sep. 26, 2002, and Korea Application No. 2002-61856, which was filed Oct. 10, 2002, the disclosures of which are expressly incorporated by reference herein in its entirety.

BACKGROUND OF THE INVENTION

1. Field of the Invention

The present invention relates to an apparatus for measuring magnetic flux of a synchronous reluctance motor and a sensorless control system for such a motor. More particularly, the present invention relates to an apparatus for measuring magnetic flux of a synchronous reluctance motor, whereby higher harmonic components, which are caused by loads generated in the motor when the motor operates, can be removed in measuring magnetic flux of the motor so as to achieve a more accurate flux measurement. The present invention also relates to a sensorless control system of a synchronous reluctance motor for estimating a speed and a rotation angle of a rotor of a synchronous reluctance motor without using a sensor. With this system it is possible to reduce errors in estimating the speed and rotation angle when the motor starts or operates at a low speed and thereby to better stabilize the system.

2. Description of the Related Art

The synchronous reluctance motor refers to a motor in which the driving source of a rotor is synchronized with the driving source of a stator and the rotor is rotated in such a manner that a magnetic resistance formed in the rotor when a current flows into the stator is minimized. It is necessary to know the position of the rotor in order to control a speed of the synchronous reluctance motor. For example, the position of the rotor can be directly detected with a rotor position detector such as an encoder in order to control the motor speed. However, it is difficult to incorporate such an encoder into devices such as the compressor of a refrigerator or an air conditioner.

Thus, a sensorless control system has recently been used, which does not require the use of the rotor position detector. The sensorless control system obtains an estimated magnetic flux and an observed magnetic flux of the motor based on a voltage and a current for driving the motor, and estimates the speed and rotation angle of the rotor based on the estimated magneticflux.

Among such synchronous reluctance motors, a concentric-winding reluctance motor as shown in FIG. 1 can be easily manufactured at a lower cost, relative to a distributed-winding reluctance motor. However, as shown in this figure, spaces between slots 3 of a stator 1 in the concentric-winding reluctance motor are so wide that six harmonic components are included in currents in the motor when a rotor 2 rotates.

FIG. 2 shows graphs of four values, i.e., a trigonometric function value (sin θ), a trigonometric function value (sin θ), a current ($i_q$), and a current ($i_v$). The trigonometric function value (sin θ) represents a real rotation angle of the rotor obtained by the encoder as a position detector. The trigonometric function value (sin θ) represents an estimated rotation angle of the rotor which is obtained based on the magnetic flux in the conventional motor speed control system. The current ($i_q$) represents a q-axis current in a rotational coordinate system which is converted from an input current of the motor, and the current ($i_v$) represents one of the actual three-phase currents which flow in the motor.

As mentioned above, referring to FIG. 1, the spaces between the slots 3 of the stator 1 in the concentric-winding reluctance motor are so wide that six harmonic components are included in the actual V-phase current that flows in the motor. Accordingly, the harmonic components are included also in the q-axis current in the rotational coordinate system. This results in a failure to obtain a sinusoidal wave correctly representing the estimated rotation angle of the rotor, while generating ripple phenomena. Such an error in estimating the rotation angle of the rotor by the speed control system lowers the accuracy and stability of the sensorless control system.

The sensorless control system of the synchronous reluctance motor, which obtains the position of the rotor without using a sensor as mentioned above, uses a first control mode as follows. In the first control mode, the speed and the rotation angle or position (hereinafter, "position" is also referred to as "rotation angle") of the rotor is obtained by measuring a voltage applied to or a current flowing into the motor, or a magnetic flux induced in the motor by the voltage and current. That is, in the first control mode, the speed and rotation of the motor is estimated based on the magnetic flux measured by a flux observer.

However, when the motor starts or operates at a low speed, a problem occurs in estimating the voltage by the flux observer, thereby causing a significant difference between the estimated values and the real values of the speed and rotation angle of the rotor.

Thus, when the motor starts or operates at a low speed, a second control mode has been used, combined with the first control mode, to prevent the estimation errors by injecting an additional signal into the flux observer. Use of the second control mode also causes the following problem. Since the determination on whether to use the second control mode is made based on the speed of the motor, the system stability is lowered at a time when the sensorless control system changes the control mode from the first control mode to the second control mode according to the speed of the motor.

In other words, when the estimated speed of the motor reaches a predetermined speed after the motor starts, the control system abruptly changes the control mode from the second control mode, which has been used during the low speed operation, to the first control mode, thereby causing instabilities such as chattering.

SUMMARY OF THE INVENTION

Therefore, the present invention has been made in view of the above problems, and it is an object of the present invention to provide an apparatus for measuring magnetic flux of a synchronous reluctance motor, whereby it is possible to measure a magnetic flux from which higher harmonic components caused by loads formed in the motor are removed. The resulting more accurate measurement will improve the performance of a system for controlling a concentric-winding synchronous reluctance motor.

It is another object of the present invention to provide a sensorless control system of a synchronous reluctance motor. In controlling the synchronous reluctance motor without using a sensor, it is possible to prevent instabilities such as chattering when the motor operates at a low or high speed and thereby to stably estimate and measure the speed and rotation angle of the rotor of the motor.

In accordance with one aspect of the present invention, the above and other objects can be accomplished by the provision of an apparatus for measuring a magnetic flux of a synchronous reluctance motor.

The apparatus includes flux output estimator that estimates a flux of a synchronous reluctance motor by removing higher harmonic components of a current in a rotational coordinate system which flows into the motor.

The apparatus further includes a flux measurer that measures a flux in a fixed coordinate system by combining a voltage in the fixed coordinate system, which is applied to the motor, and a current in the fixed coordinate system, from which higher harmonic components are removed, with the estimated flux outputted from the flux outputestimator.

Finally the apparatus includes a fixed/rotational coordinate converter for converting the measured flux outputted from the flux output estimator to a measured flux in the rotational coordinate system.

In accordance with another aspect of the present invention, there is provided a sensorless control system of a synchronous reluctance motor.

The system includes a sensorless control block for measuring a magnetic flux of a synchronous reluctance motor and estimating a rotation angle and speed of the motor based on the measured flux in order to perform a sensorless control of the motor.

The system further having a low-speed-region tracking loop unit, which is activated or not based on the estimated speed of the motor, for measuring the rotation angle and speed of a rotor of the motor so as to compensate the estimated rotation angle and the estimated speed of the sensorless control block.

Finally the system has a mode switching controller for controlling whether to activate the low-speed-region tracking loop unit based on the estimated speed, and stabilizing chattering phenomena caused by the turning on or off of the low-speed-region tracking loop unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention are described in detail with particular reference to the drawings.

Figure 1:
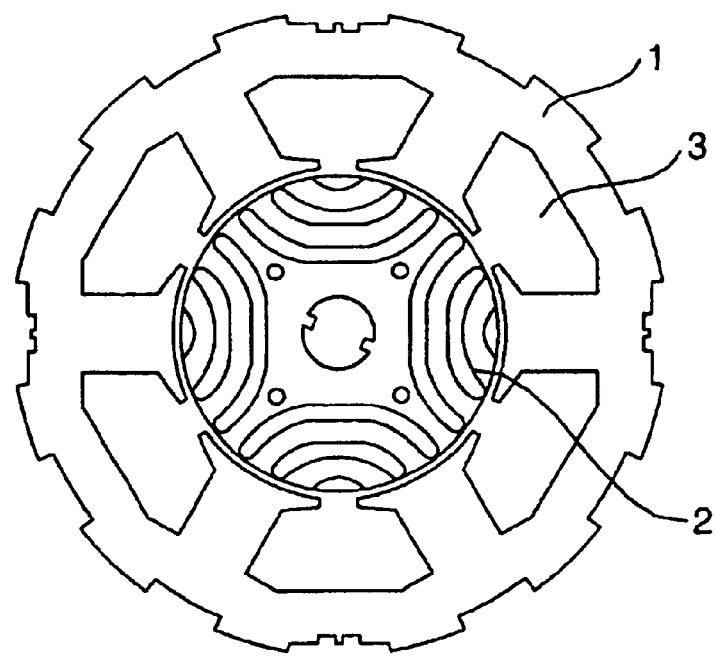
FIG. 1 is a sectional view showing a prior art concentric-winding synchronous reluctance motor.
Figure 2:
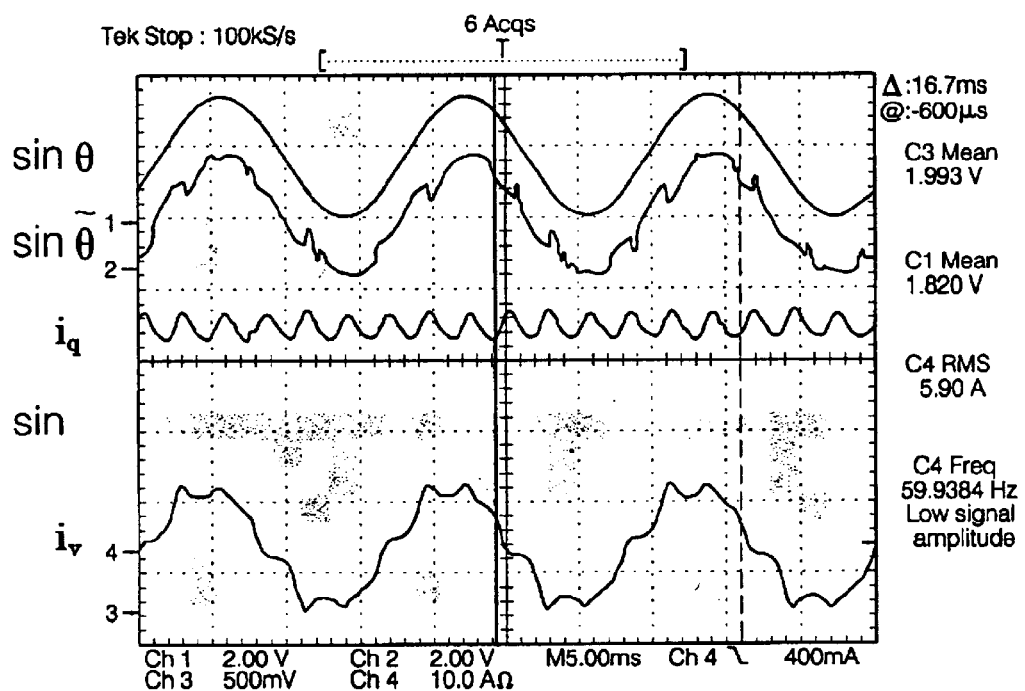
FIG. 2 is a view showing waveforms of signals generated from a control system of a prior art synchronous reluctance motor.
Figure 3:
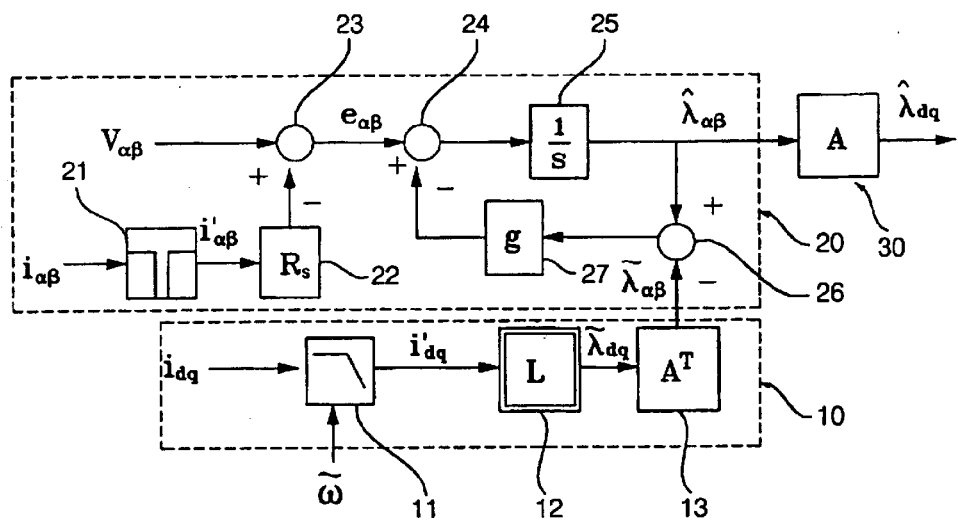
FIG. 3 is a view showing the configuration of a flux observer of a synchronous reluctance motor according to the present invention.

As shown in FIG. 3, a flux observer of a synchronous reluctance motor according to the present invention includes an estimated-flux output unit or flux output estimator 10, a measured-flux output unit or flux measurer 20, and a fixed/rotational coordinate system converter 30. The estimated-flux output unit 10 obtains and outputs an estimated flux ($\lambda_{\alpha\beta}$) of the motor by removing higher harmonic components from d,q-axis current ($i_{dq}$) in a rotational coordinate system that flow into the synchronous reluctance motor. The measured-flux output unit 20 obtains and outputs a $\alpha,\beta$-axis measured flux ($\hat{\lambda}_{\alpha\beta}$) in a fixed coordinate system by combining the estimated flux ($\lambda_{\alpha\beta}$) with both a $\alpha,\beta$-axis voltage ($V_{\alpha\beta}$) in the fixed coordinate system applied to the motor and a $\alpha,\beta$-axis current ($i'_{\alpha\beta}$) in the fixed coordinate system which is obtained by removing higher harmonic components from the $\alpha,\beta$-axis current ($i_{\alpha\beta}$) in the fixed coordinate system flowing into the motor. The fixed/rotational coordinate converter 30 converts the measured flux ($\hat{\lambda}_{\alpha\beta}$) output from the measured-flux output unit 20 to a d,q-axis measured flux ($\hat{\lambda}_{dq}$) in the rotational coordinate system.

As shown in FIG. 3, the estimated-flux output unit 10 includes a low pass filter 11, an estimated-flux selector 12, and a rotational/fixed converter 13. The low pass filter 11 obtains and outputs a harmonic-removed current ($i'_{dq}$) by removing higher harmonic components, generated by the motor's load, from the d,q-axis current ($i_{dq}$) in the rotational coordinate system that flows into the motor. The estimated-flux selector 12 selects and outputs the estimated d,q-axis flux ($\lambda_{dq}$) in the rotational coordinate system corresponding to the harmonic-removed current ($i'_{dq}$), with reference to a look-up table in which information on fluxes is stored according to currents. The rotational/fixed coordinate converter 13 converts the estimated flux ($\lambda_{dq}$) to a $\alpha,\beta$-axis estimated-flux ($\lambda_{\alpha\beta}$) in the fixed coordinate system.

The information stored in the look-up table is experimentally obtained and describes flux values in correlation with current values.

The measured-flux output unit 20 includes a band pass filter 21, a phase resistance section 22, a first adder 23, a second adder 24, and an integrator 25. The band pass filter 21 obtains and outputs a harmonic-removed current ($i'_{\alpha\beta}$) by removing higher harmonic components from the $\alpha,\beta$-axis current ($i_{\alpha\beta}$) in the fixed coordinate system that flows into the motor. The phase resistance section 22 multiplies the harmonic-removed current ($i'_{\alpha\beta}$) by a phase resistance (Rs). The first adder 23 adds the current value outputted from the phase resistance section 22 and the value of the $\alpha,\beta$-axis voltage in the fixed coordinate system. The second adder 24 adds the output value ($e_{\alpha\beta}$) from the first adder 23 and the value of the estimated flux ($\lambda_{\alpha\beta}$) output from the estimated-flux output unit 10. The integrator 25 outputs the $\alpha,\beta$-axis measured-flux ($\hat{\lambda}_{\alpha\beta}$) in the fixed coordinate system by integrating the values output from the second adder 24.

The measured-flux output unit 20 further includes a third adder 26 and a gain unit 27. The third adder 26 adds the measured flux ($\hat{\lambda}_{\alpha\beta}$) output from the integrator 25 and the estimated flux ($\lambda_{\alpha\beta}$) output from the estimated-flux output unit 10. The gain unit 27 multiplies the added value output from the third adder 26 by a reference gain value, and outputs the resulting value to the second adder 24. The gain unit 27 permits both the estimated and measured fluxes to have the same value.

When such a flux observer of the synchronous reluctance motor according to the present invention calculates the measured flux ($\hat{\lambda}_{\alpha\beta}$) and the estimated flux ($\lambda_{\alpha\beta}$) based on the voltage ($V_{\alpha\beta}$) and the current ($i_{\alpha\beta}$) in the fixed coordinate system, the sensorless control system of the synchronous reluctance motor calculates the estimated rotation angle (θ) and the estimated speed (ω) of the rotor based on the following equations 1 and 2, and thereby performs the sensorless control of the synchronous reluctance motor.

$$\sin\tilde{\theta} = \frac{\tilde{\lambda}_d \hat{\lambda}_\beta - \tilde{\lambda}_q \hat{\lambda}_\alpha}{\lambda^2} = \frac{\hat{\lambda}_{\alpha\beta} \wedge \tilde{\lambda}_{dq}}{\lambda^2}$$

$$\cos\tilde{\theta} = \frac{\tilde{\lambda}_d \hat{\lambda}_\alpha + \tilde{\lambda}_q \hat{\lambda}_\beta}{\lambda^2} = \frac{\hat{\lambda}_{\alpha\beta} \times \tilde{\lambda}_{dq}}{\lambda^2}$$

[Equation 1]

$$\tilde{\omega} = \frac{\tilde{\theta}_K - \tilde{\theta}_{K-1}}{T_S} \approx \frac{\sin(\tilde{\theta}_K - \tilde{\theta}_{K-1})}{T_S}$$

[Equation 2]

Here, $\hat{\lambda}_\alpha, \hat{\lambda}_\beta$ indicates a measured flux on the α and β axes in the fixed coordinate system of the motor respectively. Further, $\lambda_d, \lambda_q$ indicates a estimated flux on the rotational coordinate system of the motor respectively. The value λ is equal to $\sqrt{\lambda_d^2 + \lambda_q^2}$. The value Ts is the time during which the estimated rotatation angle (θ) of the motor changes from $\theta_{k-1}$ to $\theta_k$.

The values of $V_{\alpha\beta}, i_{\alpha\beta}$ indicate a fixed-α,β-axis component of an input voltage and current, respectively, obtained by converting a three-phase voltage and current which is applied to the fixed coordinate system by an inverter. The value $i_{dq}$ indicates a rotational-d,q-axis component of an input current obtained by converting a fixed-α,β-axis component ($i_{\alpha\beta}$) of the input current into the rotational coordinate system.

The measured flux ($\hat{\lambda}_{\alpha\beta}$) and the estimated flux ($\lambda_{\alpha\beta}$) in the above equations are obtained in correlation with current values, and it can be understood that both fluxes are correlated with the currents ($i_{\alpha\beta}$) and ($i_{dq}$), respectively.

As mentioned above, in the prior art, six harmonic components of an input current are generated in the sensorless control operation of the concentric-winding synchronous reluctance motor, thereby lowering the accuracy and stability of the sensorless control system. However, the present invention can secure the stability and accuracy of the sensorless control system, because the flux observer of the synchronous reluctance motor obtains the measured flux ($\hat{\lambda}_{\alpha\beta}$) and the estimated flux ($\lambda_{dq}$) after removing six harmonic components of the input current by using the low pass filter 11 and the band pass filter 21 whose low and high cutoff frequencies are adjusted according to the motor speed as described below.

Because the measured flux ($\hat{\lambda}_{\alpha\beta}$) is correlated with the fixed-α,β-axis component ($i_{\alpha\beta}$) of the input current and the current ($i_{\alpha\beta}$) is a sinusoidal wave, the harmonic components can be removed using the band pass filter. However, because the synchronous reluctance motor is subject to a variable speed control, it is difficult to suitably set the low and high cutoff frequencies. For this reason, the present invention applies the estimated speed (ω) of the motor to the band pass filter. Namely, the low and high cutoff frequencies are adjusted according to the estimated speed (ω) as shown in FIG. 4, so as to remove the harmonic components included in the current ($i_{\alpha\beta}$), irrespective of the variable speed control.

On the other hand, the estimated flux ($\lambda_{dq}$) is correlated with the rotational-d,q-axis component (or DC component) of the input current. Thus, harmonic components included in the current ($i_{dq}$) are removed by the low pass filter, so as to reduce flux estimation errors caused by the current detection errors.

In other words, according to the present invention, the harmonic components included in the sinusoidal component ($i_{\alpha\beta}$) of the input current are removed by applying the estimated speed of the motor to the band pass filter 21, whereas the harmonic components included in the DC component ($i_{dq}$) are removed using the low pass filter 11, thereby reducing errors in estimating the rotation angle of the rotor caused by the harmonic components included in the current. This results in an improvement in the accuracy and stability of the sensorless control of the concentric-winding synchronous reluctance motor.

Figure 4:
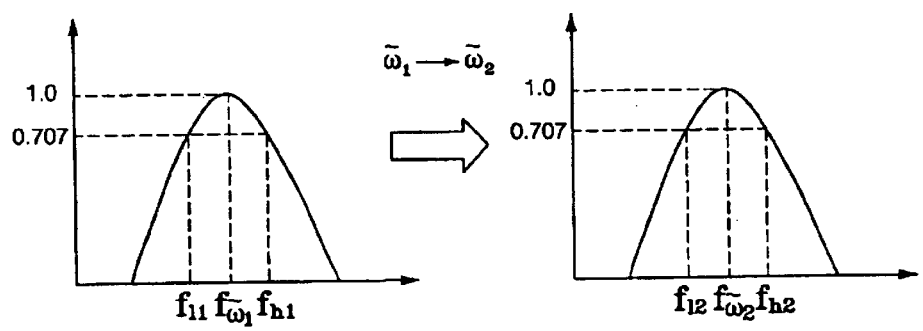
FIG. 4 is a graph illustrating cut-off frequencies of a band pass filter of FIG. 3.

FIG. 4 is a view showing an example of applying the estimated motor speed to the low and high cutoff frequencies of the band pass filter. When the estimated speed is ω1, the electric frequency of the current is $f_\omega 1$. Thus, the frequency $f_\omega 1$ is set as the resonance frequency of the band pass filter, and the low and high cutoff frequencies $f_{l1}$ and $f_{h1}$ are determined according to the set resonance frequency. If the motor control speed is changed from ω1 to ω2, the resonance frequency and the low and high cut off frequencies are adjusted to $f_\omega 2$, $f_{l2}$, and $f_{h2}$, respectively, according to the changed rotational speed, as shown in FIG. 4.

The low and high cutoff frequencies ($f_l$, $f_h$) of the band pass filter 21 are determined based on the resonance frequency ($f_\omega$) utilizing the following equation 3.

$$f_l f_h = 0.707 f_\omega^2$$

[Equation 3]

Figure 5:
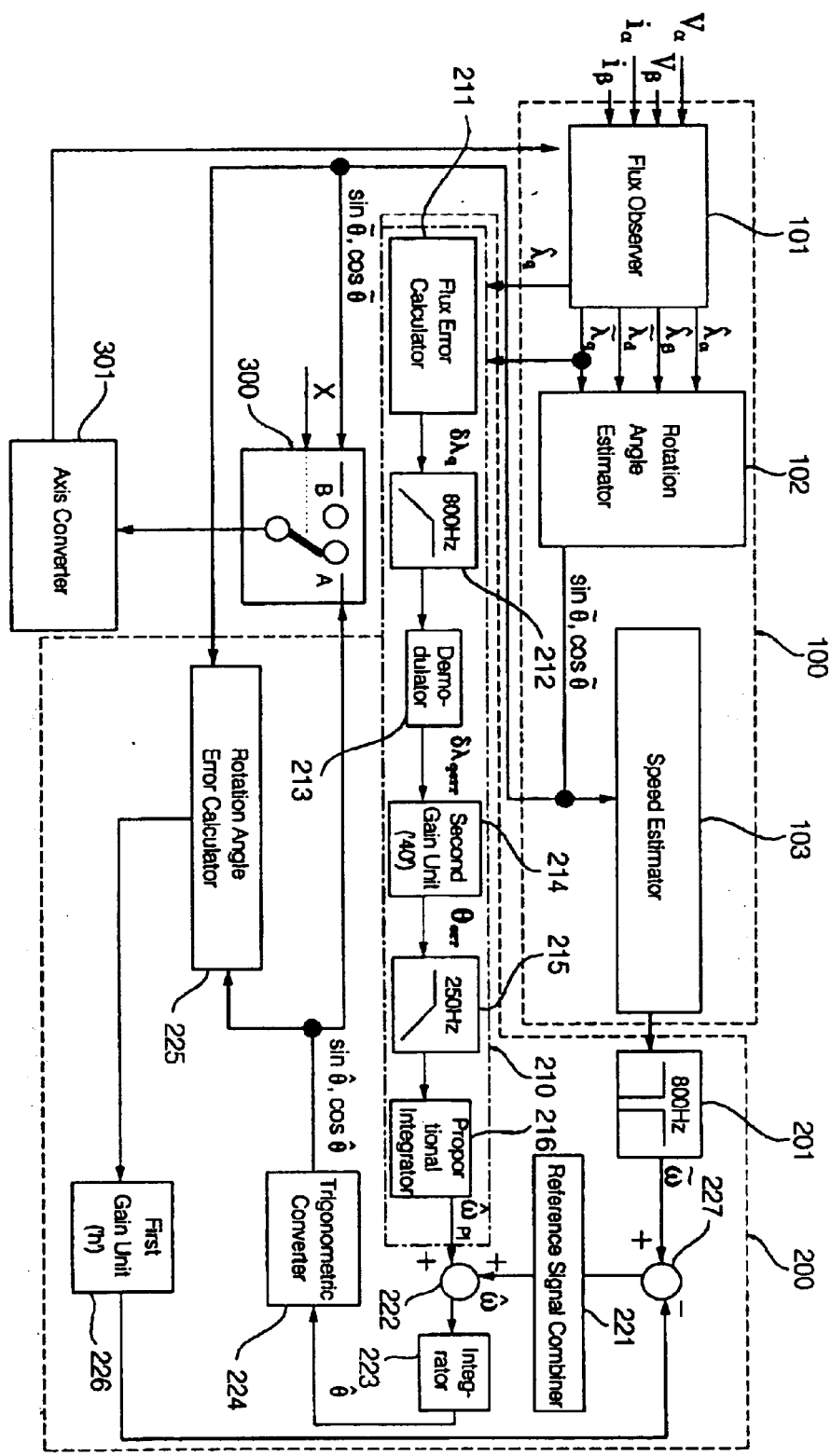
FIG. 5 is a view showing the configuration of a sensorless control system of the synchronous reluctance motor according to the present invention.

In addition, as shown in FIG. 5, the sensorless control system of the synchronous reluctance motor according to the present invention includes a sensorless control block 100, a low-speed-region tracking loop unit 200, and a mode switching controller 300. The sensorless control block 100 estimates and measures the magnetic flux of the synchronous reluctance motor, and estimates the rotation angle and speed of the motor rotor based on the estimated and measured magnetic fluxes. Based on the estimated motor speed, it is determined whether to activate the low-speed-region tracking loop unit 200. At a time when the motor starts or operates at a low speed, the tracking loop unit 200 measures the rotation angle and speed of the rotor so as to compensate for the measured rotation angle and speed of the sensorless control block 100. The mode switching controller 300 controls whether to activate the low-speed-region tracking loop unit 200, based on the measured speed, so as to stabilize the chattering phenomena caused by turning on or off the tracking loop unit 200.

The sensorless control block 100 includes a magnetic flux observer 101, a rotation angle estimator 102, and a speed estimator 103. Based on currents (Iα, Iβ) flowing into the motor and voltages (Vα, Vβ) applied to the motor on α,β axes in the fixed coordinate system, the flux observer 101 outputs measured fluxes ($\hat{\lambda}_\alpha, \hat{\lambda}_\beta$) on the α and β axes in the fixed coordinate system of the motor, estimated fluxes ($\lambda_d, \lambda_q$) on the d and q axes in the rotational coordinate system, and a measured flux ($\lambda_q$) on the q axis. The rotation angle estimator 102 calculates the sign and cosine value of the estimated rotation angles (θ) of the rotor based on the measured fluxes ($\hat{\lambda}_\alpha, \hat{\lambda}_\beta$) and the estimated fluxes ($\lambda_d, \lambda_q$) outputted from the above flux observer 101 according to the equations 1 and 2, respectively.

Based on a variable X, it is determined whether to activate the low-speed-region tracking loop unit 200. The variable X varies depending on the estimated speed (ω) of the motor, and has a higher value when the estimated speed is low, relative to when the estimated speed is high. The low-speed-region tracking loop unit 200 operates when the estimated speed is low, and functions to converge the measured rotation angle of the rotor to the real rotation angle of the rotor, so as to converge the measured speed to the real speed of the motor.

The mode switching controller 300 detects a variation in the variable X and thereby controls whether to activate the low-speed-region tracking loop unit 200. In more detail, in the case where the estimated speed of the motor increases from a low speed to a high speed, the mode switching controller 300 is firstly switched to a terminal 'A', turning on the tracking loop unit 200. Thereafter, when the estimated speed reaches a first speed in the range of 950 RPM to 1100 RPM, the mode switching controller 300 is switched to a terminal 'B', turning off the tracking loop unit 200.

On the other hand, in the case where the estimated speed of the motor decreases from a high speed to a low speed, the mode switching controller 300 is firstly switched to a terminal 'B', turning off the tracking loop unit 200, so that the motor is controlled only based on the estimated rotation angle and speed. Thereafter, when the estimated speed reaches a second speed in the range of 800 RPM to 950 RPM, the mode switching controller 300 is switched to a terminal 'A', turning on the tracking loop unit 200.

The low-speed-region tracking loop unit 200 includes a proportional measured-speed output unit 210, a reference signal combiner 221, a measured-speed calculator 222, and an integrator 223. The proportional measured-speed output unit 210 obtains and outputs a measured speed ($\hat{\omega}_{p1}$) proportional to the position of the rotor based on the measured flux from the flux observer 101. The reference-signal combiner 221 combines a reference signal ($\eta$) with a sum of the estimated speed ($\omega$) from the speed estimator 103 and a rotation angle error between the measured and estimated rotation angles of the rotor. The measured speed calculator 222 calculates the measured speed ($\hat{\omega}$) based on the proportional measured speed ($\hat{\omega}_{p1}$) and the estimated speed ($\omega$) combined with the reference signal. The integrator 223 integrates measured speeds ($\hat{\omega}$) calculated by the measured speed calculator 222, and thereby calculates a measured rotation angle ($\hat{\theta}$). The low-speed-region tracking loop unit 200 further includes a trigonometric-function converter 224, a rotation angle error calculator 225, a first gain unit 226, and an adder 227. The trigonometric-function converter 224 performs a trigonometric function conversion for the measured rotation angle ($\hat{\theta}$) outputted from the integrator 223 and then outputs the resulting value (sin $\hat{\theta}$), (cos $\hat{\theta}$) to a rotation angle error calculator 225. The rotation angle error calculator 225 calculates a rotation angle error between the estimated rotation angle ($\theta$) and the measured rotation angle ($\hat{\theta}$) using the sinusoidal values (sin $\hat{\theta}$ and sin $\theta$) outputted from the trigonometric function converter 224 and the rotation angle estimator 102, respectively. The first gain unit 226 multiplies the calculated rotation angle difference by the first reference gain value 'h'. The adder 227 adds a negative value of the rotation angle difference multiplied by 'h' and the estimated speed ($\omega$), and outputs the resulting value to the reference signal combiner 221.

The following equation 4 expresses a correlation between the estimated speed ($\omega$), the proportional measured speed ($\hat{\omega}_{p1}$), and the measured speed ($\hat{\omega}$). As expressed in the equation 4, the measured speed calculator 222 calculates the measured speed by adding the proportional measured speed ($\hat{\omega}_{p1}$) and the estimated speed ($\omega$).

$$\hat{\omega}=\hat{\omega}_{p1}+\omega \quad \text{[Equation 4]}$$

The reason why the estimated speed ($\omega$) is feed-forward compensated with the rotational angle difference multiplied by 'h' is to stabilize the transient state around a boundary between the low and high speed regions, consequently improving the control system dynamics.

The reference signal ($\eta$) combined in the reference signal combiner 221 is obtained by the following equation 5.

$$\eta=0.8+0.2(1-X) \quad \text{[Equation 5]}$$

Here, 'X' denotes a variable whose variation is detected by the mode switching controller 300.

The low-speed-region tracking loop unit 200 further includes a band pass filter 201. The band pass filter 201 performs a band pass filtering for the value output from the speed estimator 103 with a filtering frequency 800 Hz. The sensorless control system of the synchronous reluctance motor according to the present invention further includes an axis converter 301. The axis converter 301 performs an axis conversion for the value output from the trigonometric function converter 224, and outputs the resulting value to the flux observer 101.

Further, the proportional measured-speed output unit 210 of the low-speed-region tracking loop unit 200 includes a flux error calculator 211, a high pass filter 212, a demodulator 213, a second gain unit 214, a low pass filter 215, and a proportional integrator 216. The flux error calculator 211 calculates an error ($\delta\lambda_q$) between the measured flux ($\hat{\lambda}_q$) and the estimated flux ($\lambda_q$) on the q axis outputted from the flux observer 101. The high pass filter 212 performs a high pass filtering for the calculated flux error ($\delta\lambda_q$) with a filtering frequency 800 Hz. The demodulator 213 obtains a flux-error proportional value ($\delta\lambda_{qerr}$) of the rotor based on the filtered value from the high pass filter 212. The second gain unit 214 outputs a position-error proportional value ($\theta_{err}$) obtained by multiplying the flux-error proportional value from the demodulator 213 by a second reference gain value '40'. The low pass filter 215 performs a low pass filtering for the position-error proportional value ($\theta_{err}$) from the second gain unit 214 with a filtering frequency 250 Hz. The proportional integrator 216 outputs the proportional measured speed ($\hat{\omega}_{p1}$) by performing a proportional integration for the filtered value from the low pass filter 215.

Figure 6A:
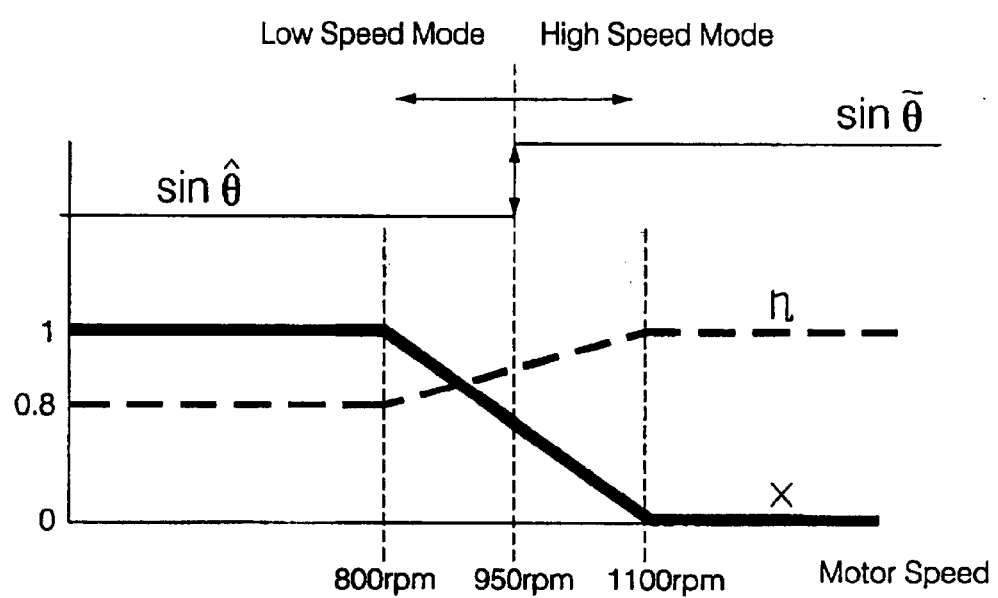
FIGS. 6a and 6b are graphs illustrating different values of the sensorless control system of the synchronous reluctance motor according to the present invention.
Figure 6B:
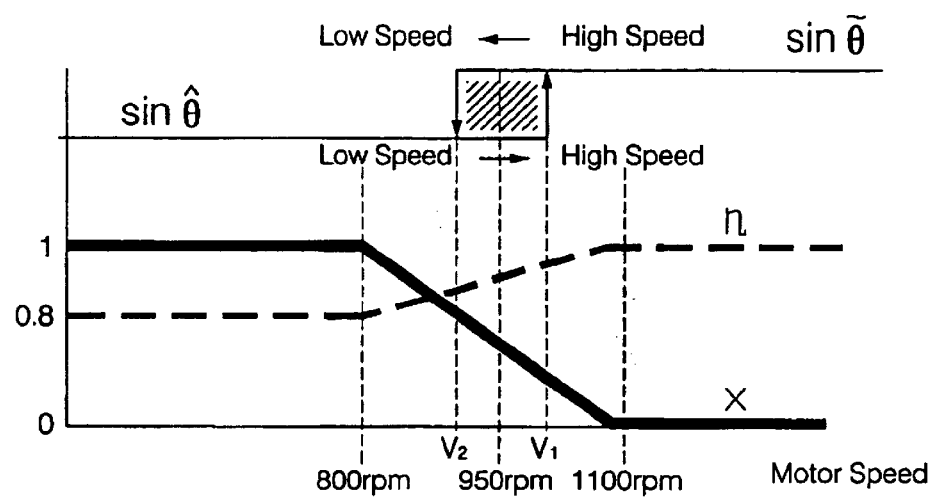

In FIGS. 6a and 6b, solid lines denote the variable X, and dotted lines denote the reference signal $\eta$. As shown in FIG. 6a and FIG. 6b, as the estimated speed of the motor increases from 800 RPM to 1100 RPM, the value of X decreases from 1 to 0, and as the estimated speed of the motor decreases from 1100 RPM to 800 RPM, the value of X increases from 0 to 1.

While the estimated speed of the motor increases from 800 RPM to 1100 RPM and thus the value of X decreases from 1 to 0, the mode switching controller 300 turns off the low-speed-region tracking loop unit 200 at a time when the estimated speed reaches 950 rpm in FIG. 6a and the first speed (V$_1$) in the range of 950 RPM to 100 RPM in FIG. 6b. On the other hand, while the estimated speed of the motor decreases from 1100 RPM to 800 RPM and thus the value of X increases from 0 to 1, the mode switching controller 300 turns on the low-speed-region tracking loop unit 200 at a time when the estimated speed reaches 950 RPM in FIG. 6a and the second speed (V$_2$) in the range of 800 RPM to 950 RPM in FIG. 6b.

Now, the operation of the sensorless control system of the synchronous reluctance motor according to the present invention is described as follows.

When the motor starts or operates at a low speed, a relatively low voltage is applied to the motor, increasing errors in measuring the voltage, and the inverter unit for driving the motor responds sensitively to the increased errors, consequently making it difficult to control the motor. Namely, when the motor starts or operates at a low speed, the flux observer alone is insufficient to correctly measure the rotation angle of the rotor. In order to compensate for such an insufficiency, the present invention additionally provides a loop for estimating the position of the rotor by means of a signal injection scheme. Such a loop is called a "low-speed-region tracking loop unit 200" in the present invention.

The following is the basic operating principle according to which the low-speed-tracking loop unit 200 operates. When the motor starts or operates at a low speed, a sinusoidal wave having a suitable frequency is applied to the d-axis flux axis. If there is no position error, the signal injection does not affect the q-axis flux axis. If there is a position error, an error occurs in synchronization with the injected signal, and thus the rotation angle of the rotor is estimated while performing a compensation control for such an error.

Referring to FIG. 5, the low-speed-region tracking loop unit 200 passes the error ($\hat{\lambda}_q - \lambda_q$) of the q-axis component through the high pass filter 212 having the cutoff frequency of 800 Hz so as to remove the DC component. Thereafter, the filtered value is subject to the demodulation procedure and a second gain procedure to obtain a value ($\theta_{err}$) proportional to the position error. After the value ($\theta_{err}$) is multiplied by the second reference gain value '40', it passes through the low pass filter 215 for compensating the proportional integrator 216. After passing through the proportional integrator 216, the proportional measured speed ($\omega_{p1}$) is outputted. The measured speed ($\hat{\omega}$) is obtained by combining the estimated speed ($\omega$), which is speed information obtained by the flux observer of the sensorless control block, with the reference signal ($\eta$) in a suitable combining ratio.

The measured speed ($\hat{\omega}$) is obtained as speed information, so the measured rotation angle ($\hat{\theta}$) as rotation angle information can also be obtained using the integrator 223. While being circulated in the low-speed tracking loop unit 200, the measured rotation angle ($\hat{\theta}$) will gradually converge to the real rotation angle of the rotor. Accordingly, the measured speed ($\hat{\omega}$) as speed information of the low-speed region will also converge to the real speed.

FIGS. 6a and 6b illustrate the operating principle of the mode switching controller 300.

As shown in these figures, if the motor speed reaches a speed of about 950 rpm to the extent that the estimated rotation angle (θ) can converge to a correct or real rotation angle, the sensorless control system of the synchronous reluctance motor uses the estimated rotation angle (θ) instead of the measured rotation angle ($\hat{\theta}$).

The variable X denoted by solid lines in FIGS. 6a and 6b determines the signal injection amount. When the motor operates at a low speed, the value of X is '1', and when the motor operates at a high speed, the value of X is '0'. In the transient region (800 rpm to 1100 rpm), the value of X decreases from '1' to '0'. Namely, the value of X is determined based on the motor speed. Consequently, the switching operation of the low-speed-region tracking loop unit 200 and the sensorless control block 100 is determined based on the motor speed.

In the case of FIG. 6a, because the switching point is based on one point of speed, even a little fluctuation in the speed at the switching point may activate again the mode switching operation, thereby causing chattering phenomena. In particular, upon being switched to use the estimated rotation angle (θ), the measured rotation angle ($\hat{\theta}$) obtained by the low-speed-region tracking loop unit 200 is not actually used even if the signal injection continues, thereby increasing errors in measuring the rotation angle. Such a problem may be overcome by using a higher value of the first reference gain 'h', but it will lower the performance of the low-speed-region tracking loop unit 200. As a result, if chattering phenomena occur at the low/high mode switching point, the stability may become increasingly worse, leading to a failure of the sensorless control.

The main problem of the case of FIG. 6a is a difference between the resulting values of the estimated speeds (ω) and rotation angles (θ) obtained by the sensorless control block and the low-speed-region tracking loop unit 200. If there is such a difference between the resulting values of both modes, the mode switching operation as shown in FIG. 6a may cause the chattering phenomena.

In other words, if the estimated speed (ω) is lower than the measured speed ($\hat{\omega}$) at a time when the low speed mode is switched to the high speed mode, the control mode immediately returns to the low speed mode. However, once changed to the high speed mode, the sensorless control performance in the low speed mode drops greatly, thereby degrading the performance of the sensorless control block.

FIG. 6b shows an example of implementing a switching between the mode of using the sensorless control block 100 and the mode of using the low-speed-region tracking loop unit 200 in which a predetermined section (hatched region) such as a hysteresis band, that is shown as hatched in this figure, is provided in order to overcome a problem such as can occur in the case of FIG. 6a. In this case, even if there is a little difference between the estimated values of the speed or rotation angle of both modes after being switched from the low speed mode to the high speed mode, it is possible to prevent an undesired mode conversion back to the low speed mode, thereby allowing a more stable sensorless control. Also when the mode conversion is made from the high speed mode to the low speed mode, it is possible to prevent such chattering phenomena, thus allowing a more stable sensorless control.

The reason why the chattering phenomena or undesired mode conversion can be prevented is as follows. The mode conversion from the low speed to the high speed is performed at the first speed ($V_1$) a little higher than 950 RPM in the case of FIG. 6a. The mode conversion from the high speed to the low speed is performed at the second speed ($V_2$) a little lower than 950 RPM in the case of FIG. 6a. Namely, the mode conversion is performed after the estimated value of the rotation angle in the mode to be switched becomes more correct.

In addition, the configuration and operation of the sensorless control system of the synchronous reluctance motor may be implemented by including the flux observer as shown in FIG. 3, instead of a general flux observer. In this case, it is possible to achieve a more correct sensorless control of the synchronous reluctance motor.

As apparent from the above description, the present invention provides an apparatus for measuring the magnetic flux of a synchronous reluctance motor and a sensorless control system of the same motor, whereby it is possible to improve the accuracy and stability of the sensorless control by reducing errors in the estimated rotation angle of the rotor of the motor which are caused by a higher harmonic wave generated by loads formed when the concentric-winding synchronous reluctance motor operates. In addition, it is possible to prevent undesired phenomena such as a chattering that may occur at a time when the control system changes the control mode to a low/high speed mode according to a low/high speed operation of the motor. In particular, the present invention provides a sensorless control system of a synchronous reluctance motor which prevents the sensorless control performance from being lowered after being switched to the high speed mode, thereby securing a high stability and performance even when there is a difference in the estimated value between the low and high speed modes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring a magnetic flux of a synchronous reluctance motor, the apparatus comprising:
   a flux output estimator that estimates a flux of a synchronous reluctance motor by removing higher harmonic components of a current, in a rotational coordinate system, which flows into the motor;
   a flux measurer that measures a flux in a fixed coordinate system by combining a voltage, in the fixed coordinate system, which is applied to the motor, and a current in the fixed coordinate system, from which higher harmonic components are removed, with the estimated flux output from the flux output estimator; and
   a fixed/rotational coordinate converter that converts the measured flux output from the flux output measurer to a measured flux in the rotational coordinate system.

2. The apparatus as set forth in claim 1, wherein the flux output estimator includes:
   a low pass filter that removes the higher harmonic components of the current in the rotational coordinate system;
   an estimated flux selector that selects and outputs a flux value corresponding to the current, from which the higher harmonic components are removed, with reference to information stored in a look-up table which describes fluxes in correlation with currents; and
   a rotational/fixed coordinate converter that converts the output estimated flux to an estimated flux in the fixed coordinate system.

3. The apparatus as set forth in claim 1, wherein the flux measurer includes:
   a band pass filter that removes the higher harmonic components from the current in the fixed coordinate system;
   a phase resistance section that multiplies the current passing through the band pass filter by a phase resistance;
   a first adder that adds the current output from the phase resistance section and the voltage in the fixed coordinate system;
   a second adder that adds the output value from the first adder and the estimated flux output from the flux output estimator;
   an integrator that integrates the output value from the second adder; and
   a third adder that adds the measured flux output from the integrator and the estimated flux output from the flux output estimator, and outputs the added flux to the second adder.

4. The apparatus as set forth in claim 3, wherein the flux measurer further includes a gain unit for multiplying the added flux output from the third adder by a reference gain value, and outputs the resulting value to the second adder.

5. The apparatus as set forth in claim 3, wherein low and high cutoff frequencies of the band pass filter are determined by the following equation:

$$f_l f_h = 0.0707 f_\omega$$

where $f_l$ denotes the low cutoff frequency of the band pass filter, $f_h$ denotes the high cutoff frequency thereof, and the $f_\omega$ denotes a frequency corresponding to an estimated speed of the motor.

6. A sensorless control system of a synchronous reluctance motor, the system comprising:
   a sensorless controller that measures a magnetic flux of a synchronous reluctance motor and that estimates a rotation angle and speed of the motor based on the measured flux in to control the motor;
   a low-speed-region tracker, which is activated or not activated based on the estimated speed of the motor, that measures the rotation angle and speed of a rotor of the motor so as to compensate the estimated rotation angle and the estimated speed of the sensorless controller; and
   a mode switching controller that controls whether to activate the low-speed-region tracker based on the estimated speed of the motor, and stabilizes chattering phenomena caused by the turning on or off of the low-speed-region tracker.

7. The sensorless control system as set forth in claim 6, wherein the sensorless controller includes:
   a flux observer that outputs the measured speed and the estimated speed based on a voltage and a current in a fixed coordinate system which are input to the motor;
   a rotation angle estimator that estimates the rotation angle of the rotor based on the estimated flux and the measured flux output from the flux observer; and
   a speed estimator for estimating the speed of the rotor based on the estimated rotation angle of the rotation angle estimator,
   wherein said low-speed-region tracker converges the measured speed to a real speed of the motor by converging the measured rotation angle to a real rotation angle of the motor, based on a variable whose value varies according to the estimated speed of the motor and which has a higher value when the estimated speed is low, and a lower value when the estimated speed is high, and
   wherein said mode switching controller controls whether to activate the low-speed-region tracker by detecting a variation of the variable in such a manner that, when the estimated speed of the motor increases from a low speed to a high speed, the low-speed-region tracker is turned off when the estimated speed reaches a first speed, and, when the estimated speed of the motor decreases from a high speed to a low speed, the low-speed-region tracker is turned on when the estimated speed reaches a second speed lower than the first speed.

8. The sensorless control system as set forth in claim 7, wherein the low-speed-region tracker includes:
   a proportional measured-speed measurer that outputs a measured speed proportional to the position of the rotor based on the flux measured by the flux observer;
   a reference signal combiner that combines a reference signal with a value obtained by adding the estimated speed output from the speed estimator and a rotation angle difference between the estimated rotation angle and the measured rotation angle of the rotor;

a measured speed calculator that calculates the measured speed based on the estimated speed combined with the reference signal and the proportional measured speed;

an integrator that calculates the measured rotation angle by integrating the measured speed calculated by the measured speed calculator;

a trigonometric function converter that performs a trigonometric function conversion for the measured rotation angle output from the integrator and outputting the resulting value to the flux observer;

a rotation angle error calculator for calculating a rotation angle error between the estimated rotation angle of the rotor and the measured rotation angle outputted from the trigonometric function converter;

a first gain unit multiplier that multiplies the calculated rotation angle error by a first reference value; and an adder that adds the estimated speed and the rotation angle error, multiplied by the first reference gain value, and outputs the added value to the reference signal combiner.

9. The sensorless control system as set forth in claim 8, wherein the proportional measured-speed measurer includes:

a flux error calculator that calculates a flux error between a measured flux and an estimated flux on a q-axis among flux components, in a rotational coordinate system, which are output from the flux observer;

a high pass filter that performs a high pass filtering for the flux error calculated by the flux error calculator;

a demodulator that obtains a flux-error proportional value of the rotor based on the filtered value outputted from the high pass filter;

a second gain multiplier that outputs a position-error proportional value to an position error obtained by multiplying the flux-error proportional value from the demodulator by a second reference gain value;

a low pass filter that low pass filters the position-error proportional value output from the second gainmultiplier; and a proportional integrator that outputs a proportional measured speed obtained by proportional-integrating the filtered value output from the low pass filter.

10. The sensorless control system as set forth in claim 8, wherein the reference signal is obtained by the following equation:

$$\eta=0.8+0.2(1-X),$$

where $\eta$ denotes the reference signal, and X denotes a variable whose variation is detected by the mode switching controller.

11. The sensorless control system as set forth in claim 7, wherein the first speed is in a range of 950 RPM to 1100 RPM and the second speed is in a range of 800 RPM to 950 RPM.

12. The sensorless control system as set forth in claim 7, wherein as the estimated speed of the motor increases from 800 RPM to 1100 RPM, the variable decreases from 1 to 0, and as the estimated speed of the motor decreases from 1100 RPM to 800 RPM, the variable increases from 0 to 1.

13. The sensorless control system as set forth in claim 12, wherein, as the variable decreases from 1 to 0, the mode switching controller turns off the low-speed-region tracker when the estimated speed of the motor reaches the first speed, and when the variable increases from 0 to 1, the mode switching controller turns on the low-speed-region tracker when the estimated speed of the motor reaches the second speed.

14. A method of measuring a magnetic flux of a synchronous reluctance motor comprising:

estimating a flux of a synchronous reluctance motor by removing higher harmonic components of a current which flows into the motor in a rotational coordinate system;

measuring a flux in a fixed coordinate system by combining a voltage in the fixed coordinate system, which is applied to the motor, and a current in the fixed coordinate system, from which higher harmonic components are removed, with the estimated flux of the motor; and converting the measured flux of the motor to a measured flux in the rotational coordinate system.

15. The method of claim 14, further comprising:

removing the higher harmonic components of the current in the rotational coordinate system;

selecting and outputting a flux value corresponding to the current, from which the higher harmonic components are removed, with reference to information stored in a look-up table having fluxes in correlation with currents; and converting the output estimated flux to an estimated flux in the fixed coordinate system.

* * * * *

UNITED STATES PATENT AND TRADEMARK OFFICE
CERTIFICATE OF CORRECTION

PATENT NO. : 6,831,439 B2
DATED : December 14, 2004
INVENTOR(S) : J.H. Won et al.

It is certified that error appears in the above-identified patent and that said Letters Patent is hereby corrected as shown below:

Title page,
Item [73], Assignee, before "Electronics" insert -- LG --.

Signed and Sealed this

Ninth Day of August, 2005

JON W. DUDAS
*Director of the United States Patent and Trademark Office*